(12) United States Patent
Tan

(10) Patent No.: US 11,003,955 B1
(45) Date of Patent: May 11, 2021

(54) MACHINE-LEARNING MODEL STRUCTURAL MERGING

(71) Applicant: Zoox, Inc., Foster City, CA (US)

(72) Inventor: Qijun Tan, San Mateo, CA (US)

(73) Assignee: Zoox, Inc., Foster City, CA (US)

( * ) Notice: Subject to any disclaimer, the term of this patent is extended or adjusted under 35 U.S.C. 154(b) by 192 days.

(21) Appl. No.: 16/403,476

(22) Filed: May 3, 2019

(51) Int. Cl.
   *G06K 9/62* (2006.01)
   *G06K 9/00* (2006.01)
   *G06K 9/32* (2006.01)

(52) U.S. Cl.
   CPC ....... *G06K 9/6262* (2013.01); *G06K 9/00791* (2013.01); *G06K 9/3233* (2013.01)

(58) Field of Classification Search
   CPC ............. G06K 9/6262; G06K 9/00791; G06K 9/3233
   See application file for complete search history.

(56) References Cited

U.S. PATENT DOCUMENTS

| | | | | |
|---|---|---|---|---|
| 2019/0114511 | A1* | 4/2019 | Gao | G06K 9/6257 |
| 2019/0294929 | A1* | 9/2019 | Yao | G06N 3/084 |
| 2020/0042871 | A1* | 2/2020 | Francini | G06K 9/6256 |

* cited by examiner

*Primary Examiner* — Phuoc Tran
(74) *Attorney, Agent, or Firm* — Lee & Hayes, P.C.

(57) ABSTRACT

Techniques for compacting an ML model by replacing a linear transformation layer and a convolutional layer with a modified convolution layer. Determining the modified convolutional layer may include determining a modified bias and/or a modified filter. In some examples, before merging the layers, an output of the linear transformation layer may be provided as input to the convolution layer (e.g., the linear transformation layer may precede the convolutional layer). The linear transformation lay may include, for example, a batch normalization layer, a pooling layer, and/or the like.

20 Claims, 4 Drawing Sheets

MACHINE-LEARNING MODEL STRUCTURAL MERGING

BACKGROUND

Machine-learning (ML) models may be trained to perform various algorithms, such as to infer a truth, state, or condition from a data set. For example, an ML model may be trained to receive an image and classify objects in the image and/or identify where the objects are located with the image. Other ML models may be trained to determine a likelihood that a transaction is fraudulent, determine whether a cell is cancerous, predict the weather, convert audio to text, etc.

A machine-learning (ML) model, once trained, may comprise computationally expensive components that increase the time it takes for the ML model to output an inference and/or require processing bandwidth that exceeds processing budgeted for the ML model and/or otherwise available on computing device(s) running the ML model.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

DETAILED DESCRIPTION

The techniques discussed herein may comprise merging (or "folding") distinct layers of an ML model into a single layer. In some examples, the ML model may comprise one or more layers such as, for example, convolutional layer(s), sub-sampling function(s) (e.g., maxpool layer(s)), rectified linear unit (ReLU) function(s), batch normalization layer(s), and/or the like. A convolutional layer of an ML model may comprise one or more filters. An output of a convolutional layer may comprise a convolution of one or more filters with one or more portions of an input thereto. In some examples, the structure of an ML model may comprise a convolutional layer followed by a batch normalization layer. Including the batch normalization layer in the ML model may increase the stability of training the ML model by decreasing the effects of internal covariate shift. For example, the distribution of inputs received at convolutional layer(s) in an intermediate portion of the ML model may continually change during training, which slows down training since the intermediate convolutional layer(s) are being modified, during training, to track continually changing distributions.

In some examples, training an ML model may be further stabilized by re-arranging the structure such that a batch normalization layer precedes a convolutional layer. The techniques discussed herein merge a (preceding) batch normalization layer into the convolutional layer to form a single layer that performs the function of both the batch normalization layer and the convolutional layer, thereby decreasing a number of computations required to run the ML model at inference time. Decreasing the computations required to run the ML model my decrease a computation cost associated with running the ML model (e.g., it may require less time and/or processing resources to run the ML model and receive an output (inference) therefrom) and/or reduce a storage and/or hardware size associated with the ML model. Meanwhile, the techniques may maintain an accuracy and/or recall rate of the ML model while simultaneously reducing the computational costs.

Example Scenario

Figure 1:
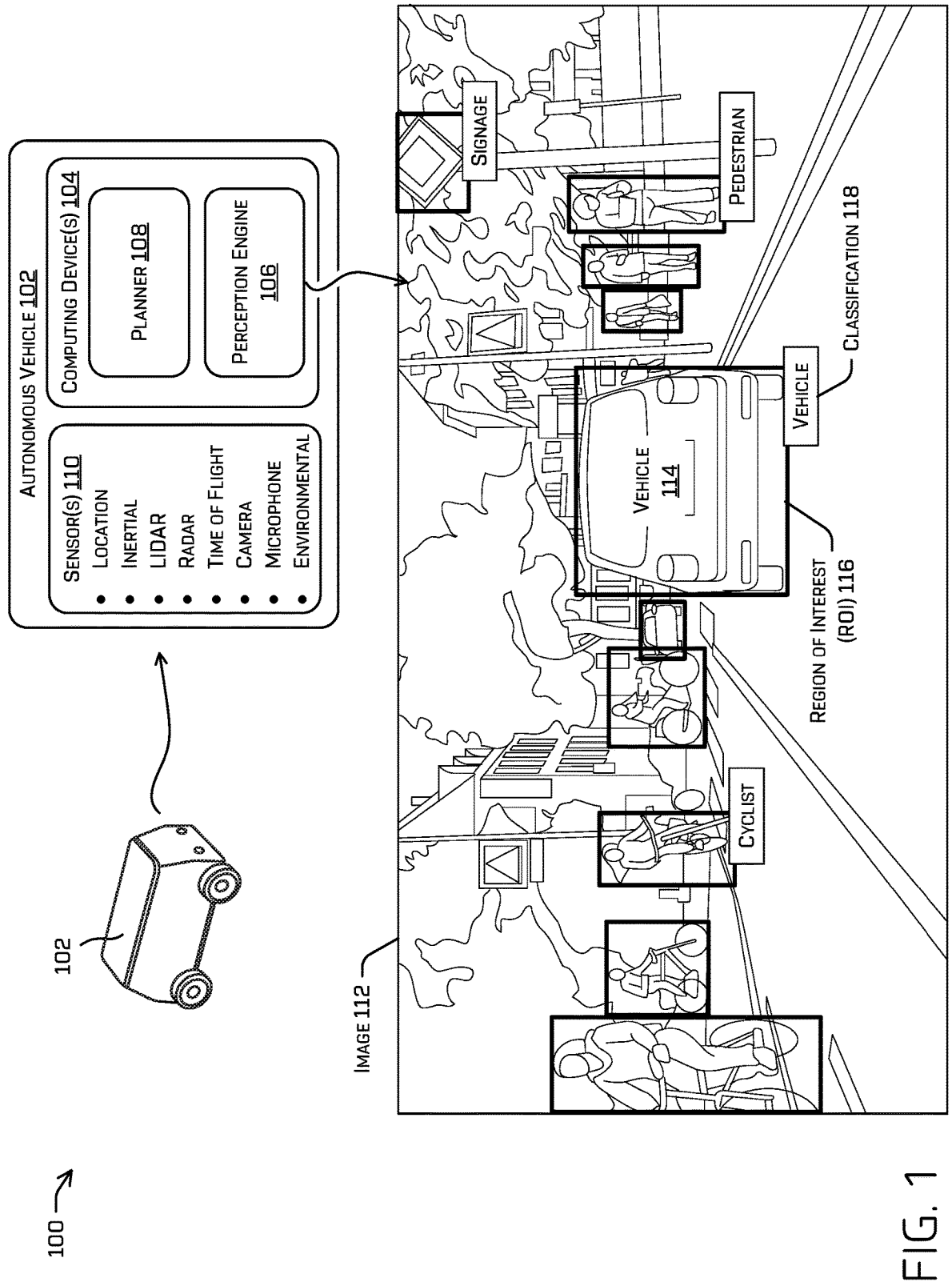
FIG. 1 illustrates an example scenario depicting an autonomous vehicle comprising one or more machine-learning (ML) models.

FIG. 1 illustrates an example scenario 100 including an autonomous vehicle 102 comprising one or more ML models. In some instances, the autonomous vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 102 may be a fully or partially autonomous vehicle having any other level or classification. It is contemplated that the techniques discussed herein may apply to more than robotic control, such as for autonomous vehicles. For example, the techniques discussed herein may be applied to ML models used in video games, manufacturing, augmented reality, etc.

The autonomous vehicle 102 may comprise computing device(s) 104 that may include one or more ML models. For example, the computing device(s) 104 may comprise a perception engine 106 and/or a planner 108, which may each comprise one or more ML models. The autonomous vehicle 102 may comprise more or less components that comprise ML model(s), but the perception engine 106 and/or planner 108 are given as a non-limiting example for the sake of comprehension.

In some examples, an ML model may comprise a neural network such as, for example, a convolutional neural network (CNN). As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters. Although discussed in the context of neural networks, any type of machine-learning can be used consistent with this disclosure.

In some examples, an ML model may comprise processor-executable instructions stored in a memory of the computing device(s) 104 and/or accessible thereto, hardware, and/or some combination thereof (e.g., a field-programmable gate array (FPGA), application-specific integrated circuit (ASIC)).

To further illustrate how the one or more ML models may be used by the autonomous vehicle 102, the autonomous vehicle 102 may receive sensor data from sensor(s) 110 of the autonomous vehicle 102. For example, the sensor data may include a location signal (e.g., a GPS signal), an inertia signal (e.g., an accelerometer signal, a gyroscope signal, etc.), a magnetometer signal, a wheel encoder signal, a speedometer signal, a point cloud of accumulated lidar and/or radar points, time of flight data, an image (or images), an audio signal, and/or bariatric or other environmental signals, etc. For example, the autonomous vehicle 102 may receive an image 112 from the sensor(s) 110. The depiction primarily discusses images/one or more computer vision ML models for ease, but it is contemplated that the techniques may be applied to ML models configured for any task.

In some examples, the perception engine 106 may include one or more ML models and/or other computer-executable instructions for detecting, identifying, segmenting, classifying, and/or tracking objects from sensor data collected from the environment of the autonomous vehicle 102. In some instances, the perception engine 106 may receive sensor data from sensor(s) 110 of the autonomous vehicle 102, determine perception data from the sensor data, and transmit the perception data to the planner 108 for use by the planner 108 to localize a position of the autonomous vehicle 102 on a global map and/or a local map, determine one or more trajectories, control motion of the autonomous vehicle 102 to traverse a path or route, and/or otherwise control operation of the autonomous vehicle 102, though any such operation may be performed in various other components (e.g., localization may be performed by a localization engine, not shown). In some instances, the perception data may comprise an region of interest (ROI) and/or a general classification associated with an object detected from sensor data by one or more ML models.

In the illustrated example, the autonomous vehicle 102 may receive the image 112 (and/or other sensor data), which includes a representation of a vehicle 114, multiple cyclists, multiple pedestrians, multiple signage objects, and a variety of different environmental objects (e.g., roadway, sidewalk, trees, buildings). An ML model of the perception engine 106 may generate an ROI 116 based at least in part on detecting vehicle 114 as being represented in the image 112 according to the parameters of the ML model associated with components of the ML model by training. FIG. 1 additionally depicts multiple other ROIs that may be generated by the perception engine 106 for different objects that may be detected by the perception engine 106, but, for simplicity and clarity, they are not all labeled. For example, the other ROIs identify cyclists, another vehicle, and traffic signage, although it is understood that additional or alternative portions of an image (and/or other sensor data) may be detected by the perception engine 106.

In some examples, the perception engine 106 may additionally or alternatively determine, by an ML model, a classification of an object. For example, the ML model may be trained to output an indication of one classification, from among a plurality of general classifications, that corresponds with a highest probability determined by the ML model. In some examples, the classifications may include, for example, "cyclist," "vehicle," "pedestrian," "animal," "environmental object," etc., examples of which also appear in FIG. 1 such as classification 118, "vehicle."

In some instances, the perception engine 106 may transmit the ROI 116 and/or classification 118, as part of perception data, to the planner 108. The planner 108 may use perception data, including ROI 116 and/or classification 118, to generate instructions for controlling operation of the autonomous vehicle 102. For example, the planner 108 may comprise one or more ML models for determining a track to associate with an object detection; determining a route for the autonomous vehicle 102 from a first location to a second location; generating, substantially simultaneously, a plurality of potential trajectories for controlling motion of the autonomous vehicle 102 in accordance with a receding horizon technique (e.g., 1 micro-second, half a second, multiple seconds, etc.) and based at least in part on the perception data, to control the vehicle to traverse the route; and/or selecting one of the potential trajectories as a trajectory of the autonomous vehicle 102 that may be used to generate a drive control signal that may be transmitted to drive components of the autonomous vehicle 102.

Example ML Model Architecture

Figure 2A:
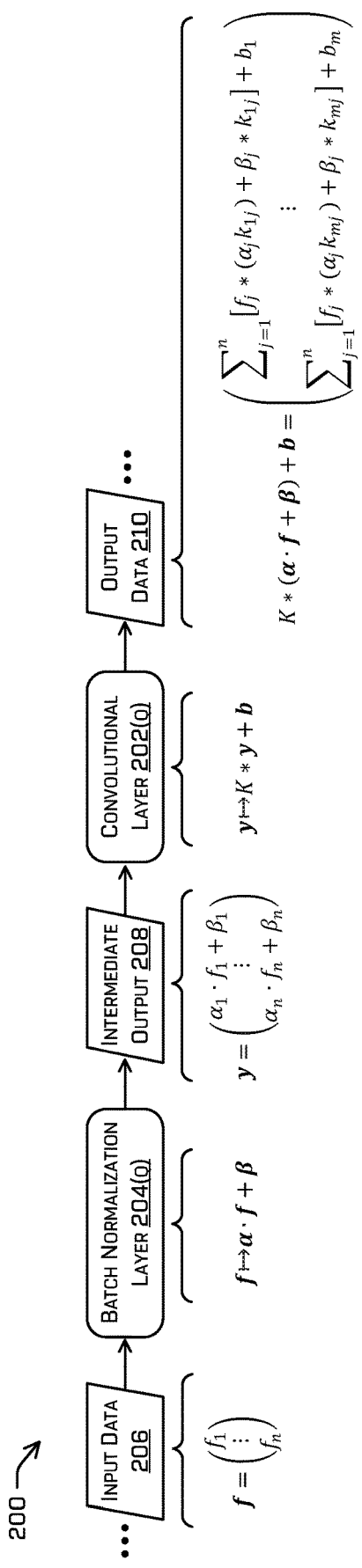
FIG. 2A illustrates a block diagram of an example architecture of an ML model comprising a batch normalization layer and a convolutional layer.

FIG. 2A illustrates a block diagram of at least a portion of an example architecture of an example ML model 200 comprising one or more convolutional layers, such as convolutional layer 202(Q). In some examples, the ML model 200 and/or the parameters associated with the components thereof may be a result of training. In some examples, the example ML model 200 may comprise a neural network such as, for example, a convolutional network. Although discussed in the context of neural networks, any type of machine-learning may be used consistent with this disclosure. For example, machine-learning algorithms may include, but are not limited to, regression algorithms, instance-based algorithms, Bayesian algorithms, association rule learning algorithms, deep learning algorithms, etc. Additional or alternative examples of neural network architectures may include neural networks such as ResNet50, ResNet101, VGG, DenseNet, PointNet, and the like.

In some examples, the convolutional layer 202(Q) may be an intermediate layer of the example ML model 200, meaning that the convolutional layer 202(Q) may be a layer after a first layer of the example ML model 200 (e.g., somewhere in the example ML model 200 after the first layer, including a last layer of the example ML model 200). In some examples, the convolutional layer 202(Q) may be preceded by a batch normalization layer 204(Q) to stabilize training of the ML model. In some contexts, a first layer that precedes a second layer may indicate that an output of the first layer is directly or indirectly (e.g., via one or more intervening layers) received as an input by the second layer in a forward pass of the ML model. Example ML model 200 may comprise additional or alternate layers such as, for example ReLU function(s), batch normalization(s), sub-sampling function(s) (e.g., maxpool, average pool, L2-norm), loss function(s)/feedback (at least during training), etc.

Although the discussion herein regards a batch normalization layer, it is understood that the techniques discussed herein may be applied to any function and/or layer that accomplishes a linear transformation of the data input thereto. In some examples, the techniques may comprise collapsing a linear layer, ReLU layer, pooling layer, and/or convolutional layer into a single convolutional layer.

In some examples, the example ML model 200 may have a structure that defines the layers thereof and/or hyperparameters associated therewith. For example, the structure may define an order, type, and/or connectivity between components of the example ML model 200 (e.g., a first convolutional layer receives raw sensor data, generates output therefrom, and provides the output to a first maxpool function, the first maxpool function provides an output to a first batch normalization layer, the first batch normalization layer provides an output to a first ReLU layer, and so on). Hyperparameters associated with a component of example ML model 200 may define properties of the structure such as, for example, a number and/or dimension of filters within one of the convolutional layer(s), such as convolutional layer 202 (Q) and/or a spatial extent, stride, amount of zero padding, input size (e.g., tensor, having dimensions $W_1 \times H_1 \times D_1$, or any other number of dimensions) and/or type (e.g., raw sensor data, tensor received from a previous component of the example ML model 200), output size and/or type (e.g., tensor having dimensions $W_1 \times H_1 \times D_1$ or $W_2 \times H_2 \times D_2$) and/or the like associated with a component of the example ML model 200.

A parameter, in contrast to a hyperparameter, may comprise any parameter that is modified during training such as, for example, a weight, bias, and/or learning rate associated with a layer or component(s) thereof, such as a filter.

In some examples, the example ML model 200 may receive sensor data from one or more sensors and/or any other type of data. The sensor data may be received by a first layer, which may transform the received data into intermediate output data and transmit the intermediate output data to a subsequent component of the example ML model 200 until a set of transformed data reaches batch normalization layer 204(Q) as input data 206.

In some examples, input data 206 may be an output of a layer previous to the batch normalization layer 204(Q). As such, input data 206 may comprise n components, where n is a positive integer, and may be represented as a tensor of functions, $$f = \begin{pmatrix} f_1 \\ \vdots \\ f_n \end{pmatrix}.$$

In some examples, the functions of the input data 206, $f_1 \ldots f_n$, may represent operations conducted by previous components of the example ML model 200 (e.g., f may comprise a feature map output by a previous layer). Although the discussion here attempts to explain the content of the input data 206, it is understood that the functions off may not be described in humanly-meaningful terms, as the functions may comprise an output that may be a computer and/or neural network transformation of the input thereto. As such, the functions may comprise a high-dimensional field of values generated by layer(s) of the respective components of the example ML model 200 (e.g., vectors and/or tensors of values representing intrinsic properties of the data determined based on the learned parameters).

The batch normalization layer 204(Q) may be trained to transform the input data 206 based at least in part on normalizing, scaling, and/or shifting the input data 206 according to parameters trained into the batch normalization layer 204(Q) during training.

In some examples, at inference time, the batch normalization layer 204(Q) may transform the input data 206 according to the following equation (where α and β may be based at least in part on learned parameter(s) and/or historic means and/or variance associated with training the batch normalization layer 204(Q), as discussed in more detail below):

$$f \mapsto \alpha \cdot f + \beta = \begin{pmatrix} \alpha_1 \cdot f_1 + \beta_1 \\ \vdots \\ \alpha_n \cdot f_n + \beta_n \end{pmatrix} \tag{1}$$

$$\text{where } \alpha = \begin{pmatrix} \alpha_1 \\ \vdots \\ \alpha_n \end{pmatrix}, \beta = \begin{pmatrix} \beta_1 \\ \vdots \\ \beta_n \end{pmatrix} \tag{2}$$

α and/or β may comprise a vector of scalars, in some examples. These variables and how they may be determined are discussed in more detail below.

During training, the batch normalization layer 204(Q) may generate an output, $y_i$, based at least in part on normalizing, scaling, and/or shifting an input, $x_i$, provided to the layer. In some examples, during training, batches comprising one or more samples of data may be provided to the example ML model 200, and $x_i$ may comprise a batch of such data transformed by one or more previous layers of the example ML model 200. During training, the function of the batch normalization layer 204(Q) may be represented as follows, where μ is a mean associated with a batch of inputs, σ is a variance associated with the batch of inputs, and γ and ϕ are learned parameters:

$$y_i = \gamma \frac{x_i - \mu}{\sqrt{\sigma^2 + \epsilon}} + \phi \tag{3}$$

However, at inference time, in some examples, the example ML model 200 may receive an input that comprises a singular set of data, rather than a batch of data. In some examples, at inference time the batch normalization layer 204(Q) may generate an output, y, based at least in part on normalizing, scaling, and/or shifting an input, x, according to historical values of the mean and/or variance (e.g., values of the mean and/or variance determined during training). For example, at inference time, the batch normalization layer 204(Q) may generate an output, y, based at least in part on determining an inference mean, $E_x$, and/or an inference variance, $Var_x$. In some examples, determining the inference mean and/or inference variance may be based at least in part on historical values of the mean and/or inference, as follows, where each batch (of historical data such as training data) had p samples and the historical values are associated with l number of batches (e.g., l number of training data sets):

$$E_x = \frac{1}{p} \sum_{i=1}^{l} \mu_i, \; Var_x = \left(\frac{p}{p-1}\right)\frac{1}{p}\sum_{i=1}^{l} \sigma_i^2 \tag{4}$$

The batch normalization layer 204(Q) may generate an output, y, at inference, based at least in part on an input, x, according to the following determination (which may comprise normalizing, shifting, and/or scaling the input according to parameters learned during training and/or historical values of input received at the example ML model 200):

$$y = \frac{\gamma}{\sqrt{Var_x + \epsilon}} x + \left(\phi - \frac{\gamma E_x}{\sqrt{Var_x + \epsilon}}\right) \tag{5}$$

This may alternately be represented as follows and as discussed herein:

$$y = \alpha \cdot f + \beta \tag{6}$$

$$\text{where } \alpha = \frac{\gamma}{\sqrt{Var_x + \varepsilon}}, \text{ and} \tag{7}$$

$$\beta = \phi - \frac{\gamma E_x}{\sqrt{Var_x + \varepsilon}} \tag{8}$$

In some examples, α may represent coefficients associated with a scaling function of a normalization layer and/or β may represent coefficients associated with a shifting function of the normalization layer.

In some examples, the structure of the example ML model 200 may define the batch normalization layer 204(Q) as preceding convolutional layer 202(Q). Accordingly, the batch normalization layer 204(Q) may provide an intermediate output 208, defined at equations (1) and (6), to the convolutional layer 202(Q).

Convolutional layer 202(Q) may comprise one or more filters. A filter is represented herein as $K=(k_{ij})_{m \times n}$, which may be a discretized representation of one or more filters. It is understood that the function of a filter may be represented in other domains, such as in time-domain, s-domain, and/or the like. A discretized representation of the filter may be represented as a matrix having m×n dimensions, where m and n are positive integers and where m is associated with a number of outputs from (and/or filters of) the filter (see Equation (13)—the output tensor includes 1-m elements) and n is associated with a number of inputs to the filter. Note that i and j are respective row and column indexes of the filter, $k_{ij}$, having maximum values of m and n, respectively. In some examples, parameters associated with the convolutional layer 202(Q), such as values of one or more filters and/or one or more biases, may be based at least in part on training the example ML model 200.

In some examples, a filter of a convolutional layer 202(Q) may receive intermediate output 208, y, which may comprise a vector of functions and/or values (e.g., the intermediate output 208 may comprise a tensor). The convolutional layer 202(1) may transform the intermediate output 208 based at least in part on the filter and/or a bias associated with the convolutional layer 202(Q), as represented below (where b represents 1-$m$ biases associated with the convolutional layer 202(Q)):

$$y \mapsto K*y + b \qquad (9)$$

$$\text{where } b = \begin{pmatrix} b_1 \\ \vdots \\ b_m \end{pmatrix} \qquad (10)$$

In some examples, the techniques discussed herein reduce a number of layers of the example ML model 200 by collapsing the batch normalization layer 204(Q) into the convolutional layer 202(Q) to form a merged layer 212(Q).

Figure 2B:
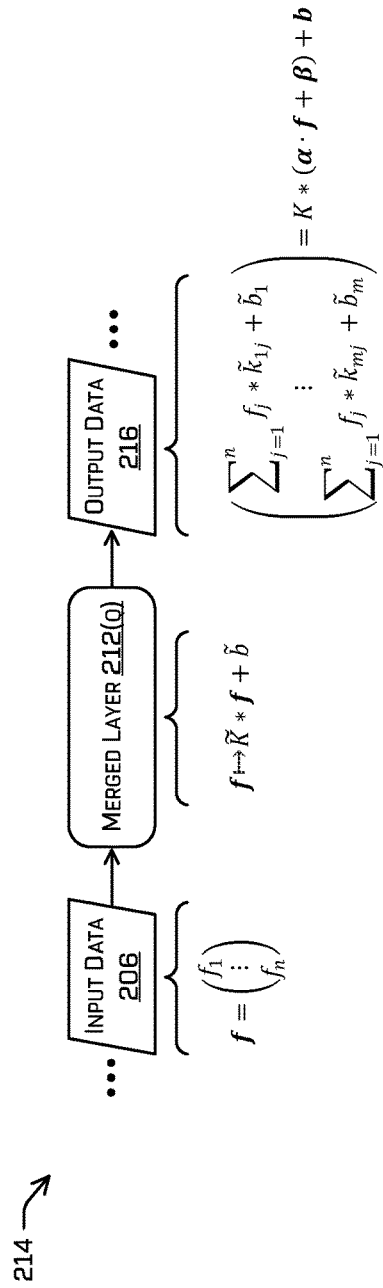
FIG. 2B illustrates a block diagram of an example architecture of an ML model comprising a merged layer that accomplished the functions of a batch normalization layer and a convolutional layer.

FIG. 2B illustrates a block diagram of at least a portion of a compacted ML model 214 comprising a merged layer 212(Q) that performs the function of convolutional layer 202(Q) and batch normalization layer 204(Q). In some examples, a compacted ML model 214 may be an ML model having a same output but a different number of layers compared to an ML model from which the compacted ML model 214 was derived (i.e., example ML model 200 in this example). Collapsing the batch normalization layer 204(Q) may comprise determining a merged layer 212(Q) based at least in part on the batch normalization layer 204(Q) and the convolutional layer 202(Q), such that the merged layer 212(Q) accomplishes the functions of the batch normalization layer 204(Q) and the convolutional layer 202(Q). In some examples, the merged layer 212(Q) may comprise a convolutional layer having a modified filter, $\tilde{K}$, and/or modified bias, $\tilde{b}$. The merged layer 212(Q) may be expressed as follows:

$$f \mapsto \tilde{K}*f + \tilde{b} \qquad (11)$$

The techniques discussed herein may comprise determining the modified filter, $\tilde{K}$, and/or modified bias, $\tilde{b}$ such that the calculation determined by the merged layer 212(Q) is equivalent to the combined output of the two calculations of the batch normalization layer 204(Q) and convolutional layer 202(Q), e.g.:

$$K*y+b=\tilde{K}*f+\tilde{b} \qquad (12)$$

The techniques discussed herein may comprise determining the modified filter, $\tilde{K}$, and/or modified bias, $\tilde{b}$, based at least in part on the learned parameters associated with the filter, K, and/or bias, b, of the convolutional layer 202(Q) and historical values and/or learned parameters associated with the batch normalization layer 204(Q), such as represented by α and β above. The following discussion details examples techniques for determining the modified filter, $\tilde{K}$, and/or modified bias, $\tilde{b}$.

Since, in some examples, the layer previous to the convolutional layer 202(Q) is the batch normalization layer 204(Q), the convolutional layer 202(Q) may convolve and/or bias the intermediate output 208, y=α·f+β. For example, the output data 210 determined by the convolutional layer 202(Q) may be represented as follows (where y comprises the intermediate output 208 determined by the batch normalization layer):

$$K*y+b = K*(\alpha \cdot f + \beta) + b = \begin{pmatrix} \sum_{j=1}^{n}[f_j*(\alpha_j k_{1j})+\beta_j*k_{1j}]+b_1 \\ \vdots \\ \sum_{j=1}^{n}[f_j*(\alpha_j k_{mj})\beta_j*k_{mj}]+b_m \end{pmatrix} \qquad (13)$$

Since, in some examples, $\alpha_j$ may be a scalar, determining an i-th modified filter, $\tilde{k}_{ij}$, may comprise multiplying the respective elements of the i-th filter with the respective $\alpha_j$ term, i.e., $\tilde{k}_{ij}=\alpha_j k_{ij}$. The one or more modified filters associated with the merged layer 212(Q) may be represented as follows:

$$\tilde{K}=(\tilde{k}_{ij})_{m \times n}. \qquad (14)$$

Turning to the remainder of Equation (13), in some examples, $\beta_j$ may be a constant function (see Equation (8), where φ is a learned parameter associated with the batch normalization layer 204(Q)). Convolving a non-zero constant function with any (closed) function is a constant function, noting that convolving a non-zero constant function with an infinite and non-closed function may result in a non-constant function. Since $k_{ij}$ may comprise a closed set of parameters (e.g., weights) associated with a filter and since $\beta_j$ may be considered a constant function, then the convolution $\beta_j*k_{ij}$ may be considered a scalar. Summing a scalar, $\beta_j*k_{ij}$, with a scalar, $b_i$ results in a scalar. Determining the modified bias may comprise determining a sum of the convolution of the respective β terms of the batch normalization layer 204(Q) with respective weights of a filter for each filter associated with the convolutional layer 202(Q), which may be represented as follows:

$$\tilde{b} = \begin{pmatrix} \sum_{j=1}^{n} \beta_j*k_{1j}+b_1 \\ \vdots \\ \sum_{j=1}^{n} \beta_j*k_{mj}+b_m \end{pmatrix} \qquad (15)$$

Since the weights associated with an i-th filter, $k_{ij}$, may be represented as a matrix, this may be further simplified. For example, determining the modified bias may comprise determining a reduced sum of the filter, $k_{ij}$. Determining a reduced sum of an i-th filter, $k_{ij}$, may comprise summing all the terms of the i-th filter (where $k_{ij,lq}$ represents the l-q-th entry of $(k_{ij})_{m \times n}$):

$$\text{where reduced\_sum}(k_{ij})=\Sigma_{l,q} k_{ij,lq} \qquad (16)$$

In some examples, determining the modified bias may eschew calculating a convolution, by determining the modified bias by determining a reduced sum of a filter, $k_{ij}$, and multiplying the reduced sum of the filter by the β term and summing that result to the original bias, $b_i$, as reflected below:

$$\tilde{b} = \begin{pmatrix} \sum_{j=1}^{n} \beta_j \cdot reduced\_sum(k_{1j}) + b_1 \\ \vdots \\ \sum_{j=1}^{n} \beta_j \cdot reduced\_sum(k_{mj}) + b_m \end{pmatrix} \quad (17)$$

Thus, an m-th modified bias, $\tilde{b}_m$, may represent the following portion of Equation (13):

$$\sum_{j=1}^{n} [\beta_j * k_{mj}] + b_m.$$

Note that a reduced summation may be characterized as an element-by-element sum of the elements of a filter.

The merged layer 212(Q) may comprise a modified filter that is based at least in part on a filter associated with the convolutional layer 202(Q) and historical values and/or learned parameters associated with the batch normalization layer 204(Q) and/or a modified bias that is based at least in part on a bias associated with the convolutional layer 202(Q) and historical values and/or learned parameters associated with the batch normalization layer 204(Q). For example, the merged layer 212(Q) may be represented as follows, reproducing Equations (11), (14), and (17):

$$f \mapsto \tilde{K} * f + \tilde{b} \quad (11)$$

where $\tilde{K} = (\alpha_j k_{ij})_{m \times n}$, and $\quad (14)$ $$\tilde{b} = \begin{pmatrix} \sum_{j=1}^{n} \beta_j \cdot reduced\_sum(k_{1j}) + b_1 \\ \vdots \\ \sum_{j=1}^{n} \beta_j \cdot reduced\_sum(k_{mj}) + b_m \end{pmatrix} \quad (17)$$

The output of the merged layer 212(Q), output data 216, may be represented as follows and is equivalent to the combined output of the batch normalization layer 204(Q) and convolutional layer 202(Q), output data 210:

$$\tilde{K} * f + \tilde{b} = \quad (18)$$

$$\begin{pmatrix} \sum_{j=1}^{n} f_j * \tilde{k}_{1j} + \tilde{b}_1 \\ \vdots \\ \sum_{j=1}^{n} f_j * \tilde{k}_{mj} + \tilde{b}_m \end{pmatrix} = \begin{pmatrix} \sum_{j=1}^{n} [f_j * (\alpha_j k_{1j}) + \beta_j * k_{1j}] + b_1 \\ \vdots \\ \sum_{j=1}^{n} [f_j * (\alpha_j k_{mj}) + \beta_j * k_{mj}] + b_m \end{pmatrix} =$$

$$K * (\alpha \cdot f + \beta) + b = K * y + b$$

Example Process

Figure 3:
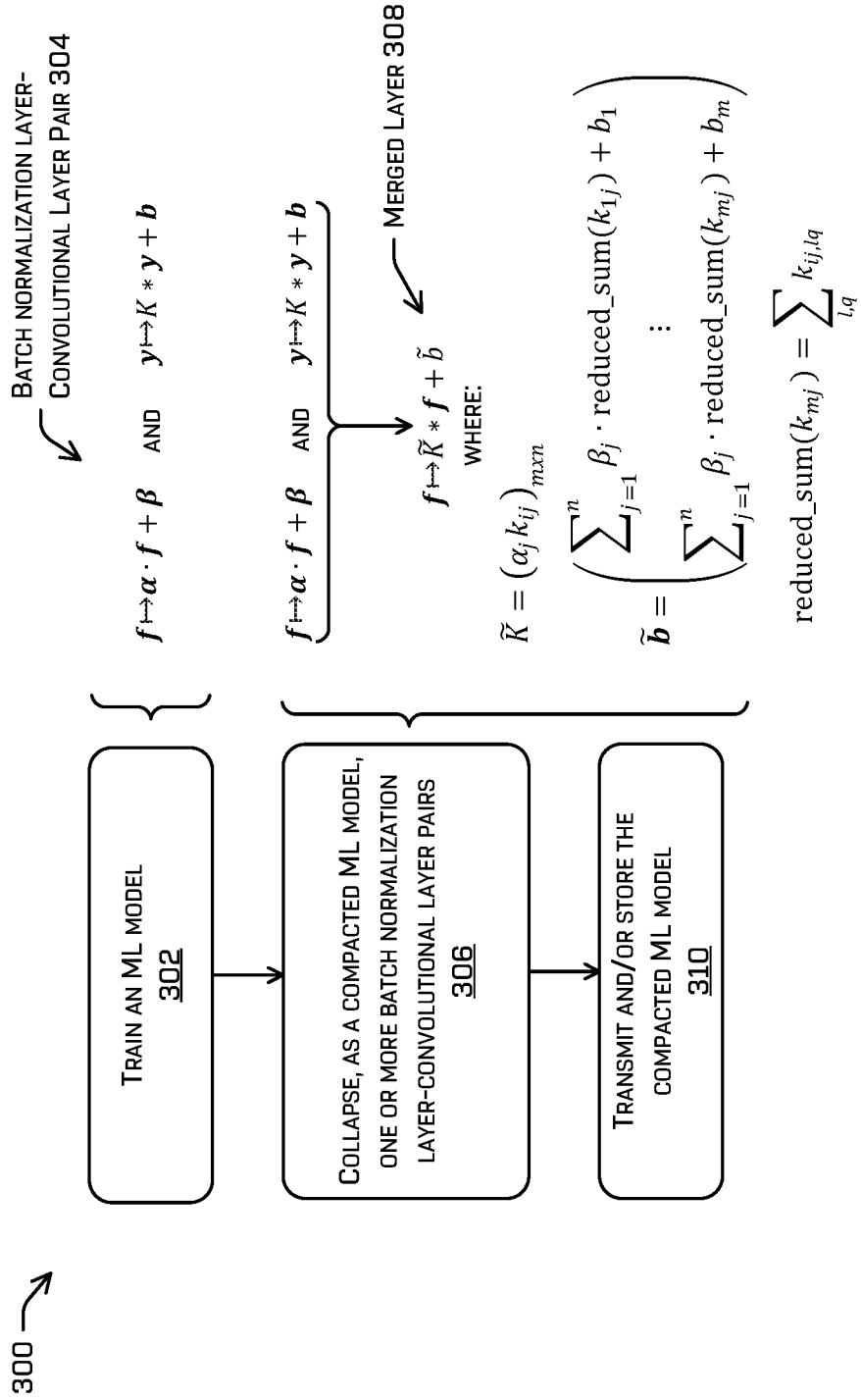
FIG. 3 illustrates a flow diagram of an example process for merging a batch normalization layer into a convolutional layer according to the techniques discussed herein.

FIG. 3 illustrates an example process 300 for training and/or collapsing portions of an ML model according to the techniques discussed herein. The collapsing techniques discussed herein may achieve a compacted ML model structure that comprises a reduced number of computations and/or convolutions and may, therefore, be faster and/or require less storage and/or hardware space than the originally-trained ML model.

At operation 302, example process 300 may comprise training an ML model, according to any of the techniques discussed herein. For example, training the ML model may comprise training one or more batch normalization layers and/or one or more convolutional layers. In some examples, at least one of the batch normalization layers may precede a convolutional layer—such a portion of the ML model structure is referred to herein as a batch normalization layer-convolutional layer pair 304. The ML model may comprise one or more such pairs.

In some examples, training one or more batch normalization layer-convolutional layer pairs may comprise modifying parameter(s) associated with the batch normalization layer (e.g., the γ and/or ϕ terms discussed above) and/or parameter(s) associated with the convolutional layer (e.g., weights, biases) to reduce a loss associated with an error between a ground truth and an output of the ML model and/or according to a fitting algorithm, such as a regression technique. Modifying the parameter(s) (e.g., the weights, biases, γ terms, and/or ϕ terms) may be part of an error backpropagation technique such as, for example, a regression, gradient descent, and/or other iterative loss and determining the loss may comprise determining a cross-entropy, Huber loss, mean absolute error ("L1 loss"), mean squared error ("L2 loss"), and/or the like. Tuning the parameter(s) to reduce the loss may increase an accuracy and/or recall of the ML model in accomplishing a task, e.g., a classification task, a regression task, and/or the like.

For example, training a computer vision ML model may comprise receiving an output from the ML model (e.g., a region of interest (ROI) identifying a location of an object in an image, a classification of an object in an image), receiving a ground truth (e.g., a ground truth ROI that identifies the true location of the object within the image, a ground truth classification that identifies the true classification of the object), and modifying parameter(s) of a convolutional layer and/or batch normalization layer of the ML model based at least in part on reducing an error associated with the output of the ML model (e.g., a difference between the ROI and the ground truth ROI and/or a difference between the classification and the ground truth classification). In some examples, the first loss may comprise a loss for training the ML model to perform the function for which the ML model is being trained (e.g., object detection, object classification, object tracking, speech recognition).

Training the ML model may comprise providing one or more batches of training data to the ML model, where an individual batch of training data may comprise p samples of training data to the ML model, where p is a positive integer. In some examples, the batch normalization layer may determine a mean and/or variance of p samples received at the batch normalization layer and associated with a batch (see Equation(s) (3), (7), and/or (8)). The batch normalization layer may normalize, scale, and/or shift the inputs thereto to reduce internal covariate shift. In some examples, the means and/or variances determined by the batch normalization layer in association with one or more batches during training may be saved in a memory as historical values. In additional or alternate examples, means and/or variances may be determined at inference time over multiple inputs to the ML model (e.g., since, in some examples, data provided as input to the ML model may not be part of a batch, a variance would be 0-valued unless multiple inputs were retained and available to the batch normalization layer).

In some examples, operation 302 may additionally or alternatively comprise receiving a final output from a last layer of the ML model and/or any other layer which makes available an output therefrom. The final output may be associated with a task for which the ML model is being trained. For example, the final output may comprise a classification of an object in an image, an ROI associated with image, a probability associated therewith, a likelihood that a cell is cancerous, a speech transcription, an embedding identifying a classification (e.g., a genre of a movie, an origin of a word, a type of an article of clothing), and/or the like. The ground truth may therefore be associated with the task for which the ML model is being trained, e.g., the ground truth may identify a location of an object in an image, whether a cell is cancerous, a true transcription of speech, and/or the like.

At operation 306, example process 300 may comprise collapsing, as a compacted ML model, one or more batch normalization layer-convolutional layer pairs, according to any of the techniques discussed herein. Operation 306 may comprise identifying one or more batch normalization layer-convolutional layer pairs in an ML model and may collapse the one or more batch normalization layer-convolutional layer pairs into one or more respective merged layers. In some examples, operation 306 may occur after training has been completed and/or a substantial portion of training is complete.

In some examples, collapsing a batch normalization layer-convolutional layer pair 304 may comprise determining a modified filter and/or a modified bias to associate with a merged layer 308. Determining the modified filter may be based at least in part on historical values (e.g., mean and/or variances associated with training data, such as batch(es) of training data) and/or learned parameter(s) associated with a batch normalization layer and/or learned parameter(s) associated with a filter of the convolutional layer. Determining the modified bias may be based at least in part on historical values (e.g., mean and/or variances associated with training data, such as batch(es) of training data) and/or learned parameter(s) associated with a batch normalization layer and/or learned parameter(s) associated with a bias of the convolutional layer. In some examples, collapsing a batch normalization layer into a convolutional layer may comprise replacing the batch normalization layer and the convolutional layer with a merged layer (e.g., a merged layer having a modified filter and/or modified bias determined according to historical values and/or learned parameter(s) associated with the batch normalization layer-convolutional layer pair).

In some examples, operation 306 may automatically be completed at the end of training the ML model 302 as part of preparing the ML model for inference time.

At operation 310, example process 300 may transmitting and/or storing the compacted ML model, according to any of the techniques discussed herein. In some examples, operation 310 may comprise transmitting the compacted ML model to one or more vehicles of a vehicle fleet. In some examples, a vehicle may receive the compacted ML model and control operation of the vehicle based at least in part on output received from the compacted ML model. A compacted ML model may comprise one or more batch normalization layer-convolutional layer pairs and/or one or more merged layers.

Example process 300 may comprise more or less operations than those discussed herein and depicted in FIG. 3. Moreover, the operations may be conducted in a different order and/or the operations may be conducted in parallel (substantially simultaneously, in some instances) and/or in series.

Example System

Figure 4:
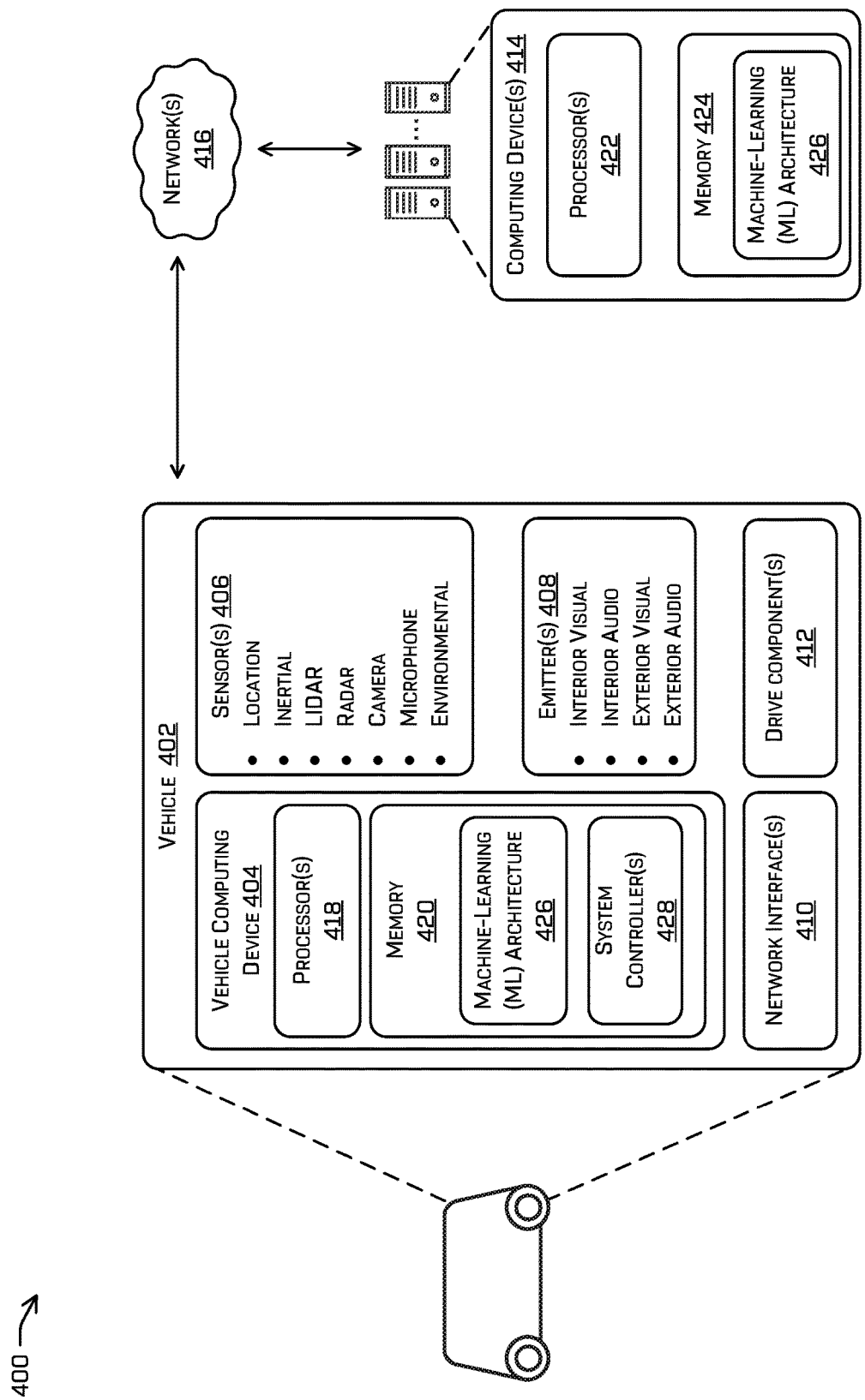
FIG. 4 illustrates a block diagram of an example system for training, merging layer(s) of an ML model, and/or using a layer-merged ML model.

FIG. 4 illustrates a block diagram of an example system that implements the techniques discussed herein. In some instances, the system 400 may include a vehicle 402, which may correspond to the autonomous vehicle 102 in FIG. 1. In some instances, the vehicle 402 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 402 may be a fully or partially autonomous vehicle having any other level or classification. Moreover, in some instances, the techniques described herein may be usable by non-autonomous vehicles as well. It is contemplated that the techniques discussed herein may apply to more than robotic control, such as for autonomous vehicles. For example, the techniques discussed herein may be applied to video games, manufacturing, augmented reality, etc.

The vehicle 402 may include a vehicle computing device 404, one or more sensor(s) 406, one or more emitters 408, one or more network interfaces 410, and/or one or more drive components 412. In some instances, vehicle computing device 404 may represent computing device(s) 104 and/or sensor(s) 406 may represent sensor(s) 110.

In some instances, the sensor(s) 406 may include lidar sensors, radar sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., red-green-blue (RGB), infrared (IR), intensity, depth, time of flight, etc.), microphones, wheel encoders, environment sensors (e.g., temperature sensors, humidity sensors, light sensors, pressure sensors, etc.), etc. The sensor(s) 406 may include multiple instances of each of these or other types of sensors. For instance, the lidar sensors may include individual lidar sensors located at the corners, front, back, sides, and/or top of the vehicle 402. As another example, the cameras may include multiple cameras disposed at various locations about the exterior and/or interior of the vehicle 402. The sensor(s) 406 may provide input to the vehicle computing device 404.

The vehicle 402 may also include emitter(s) 408 for emitting light and/or sound. The emitter(s) 408 in this example may include interior audio and visual emitter(s) to communicate with passengers of the vehicle 402. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 408 in this example may also include exterior emitter(s). By way of example and not limitation, the exterior emitter(s) in this example include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 402 may also include network interface(s) 410 that enable communication between the vehicle 402 and one or more other local or remote computing device(s). For instance, the network interface(s) 410 may facilitate communication with other local computing device(s) on the vehicle 402 and/or the drive component(s) 412. Also, the network interface (s) 410 may additionally or alternatively allow the vehicle to communicate with other nearby computing device(s) (e.g., other nearby vehicles, traffic signals, etc.). The network interface(s) 410 may additionally or alternatively enable the vehicle 402 to communicate with a computing device(s) 414. In some examples, computing device(s) 414 may comprise one or more nodes of a distributed computing system (e.g., a cloud computing architecture).

The network interface(s) 410 may include physical and/or logical interfaces for connecting the vehicle computing device 404 to another computing device or a network, such as network(s) 416. For example, the network interface(s) 410 may enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s). In some instances, the vehicle computing device 404 and/or the sensor(s) 406 may send sensor data, via the network(s) 416, to the computing device(s) 414 at a particular frequency, after a lapse of a predetermined period of time, in near real-time, etc.

In some instances, the vehicle 402 may include one or more drive components 412. In some instances, the vehicle 402 may have a single drive component 412. In some instances, the drive component(s) 412 may include one or more sensors to detect conditions of the drive component(s) 412 and/or the surroundings of the vehicle 402. By way of example and not limitation, the sensor(s) of the drive component(s) 412 may include one or more wheel encoders (e.g., rotary encoders) to sense rotation of the wheels of the drive components, inertial sensors (e.g., inertial measurement units, accelerometers, gyroscopes, magnetometers, etc.) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive component(s) 412. In some cases, the sensor(s) on the drive component(s) 412 may overlap or supplement corresponding systems of the vehicle 402 (e.g., sensor(s) 406).

The drive component(s) 412 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 412 may include a drive component controller which may receive and preprocess data from the sensor(s) and to control operation of the various vehicle systems. In some instances, the drive component controller may include one or more processors and memory communicatively coupled with the one or more processors. The memory may store one or more components to perform various functionalities of the drive component(s) 412. Furthermore, the drive component(s) 412 may also include one or more communication connection(s) that enable communication by the respective drive component with one or more other local or remote computing device(s).

The vehicle computing device 404 may include one or more processors, processor(s) 418, and memory 420 communicatively coupled with the one or more processors 418. Computing device(s) 414 may additionally or alternatively include processor(s) 422, and/or memory 424. The processor(s) 418 and/or 422 may be any suitable processor capable of executing instructions to process data and perform operations as described herein. By way of example and not limitation, the processor(s) 418 and/or 422 may comprise one or more central processing units (CPUs), graphics processing units (GPUs), integrated circuits (e.g., application-specific integrated circuits (ASICs), etc.), gate arrays (e.g., field-programmable gate arrays (FPGAs), etc.), and/or any other device or portion of a device that processes electronic data to transform that electronic data into other electronic data that may be stored in registers and/or memory.

Memory 420 and/or 424 may be examples of non-transitory computer-readable media. The memory 420 and/or 424 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 420 and/or memory 424 may store an ML architecture 426 representative of at least one of one or more ML models of the vehicle computing device 404. ML architecture 426 may include and/or represent an ML model of perception engine 106 and/or planner 108 (or any other system of the vehicle 402 comprising an ML model), example ML model 200, and/or compacted ML model 214.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BBN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

Memory 420 may additionally or alternatively store one or more system controller(s) 428 (which may additionally or alternatively be implemented as hardware), which may be configured to control steering, propulsion, braking, safety, emitters, communication, and other systems of the vehicle 402. These system controller(s) 428 may communicate with and/or control corresponding systems of the drive component(s) 412 and/or other components of the vehicle 402. For example, a planner may generate instructions for controlling vehicle 402 based at least in part on an output of ML architecture 426 and transmit the instructions to the system controller(s) 428, which may control operation of the vehicle 402 based at least in part on the instructions.

It should be noted that while FIG. 4 is illustrated as a distributed system, in alternative examples, components of the vehicle 402 may be associated with the computing device(s) 414 and/or components of the computing device(s) 414 may be associated with the vehicle 402. That is, the vehicle 402 may perform one or more of the functions associated with the computing device(s) 414, and vice versa.

Example Clauses

A. A method comprising: training a neural network, based at least in part on a plurality of batches, a batch comprising a plurality of samples and the neural network comprising at least a normalization layer and a convolutional layer, wherein an output of the normalization layer is input into the convolutional layer; determining, based at least in part on the plurality of batches and the training, a variance and a mean associated with the plurality of batches; determining, based at least in part on the plurality of batches and the training, a filter associated with the convolutional layer, wherein the filter comprises a weight and a bias; determining, based at least in part on at least one of the mean, the variance, a first learned parameter associated with the normalization layer, or the weight, a modified filter associated with the convolutional layer; determining, based at least in part on at least one of the mean, the variance, the first learned parameter, or the bias, a modified bias; and modifying, as a modified neural network, the neural network by replacing the normalization layer and the convolution layer with a modified convolution layer, the modified convolution layer comprising the modified filter and the modified bias.

B. The method of paragraph A, wherein determining the modified filter comprises multiplying the filter by a scalar vector associated with a scaling function of the normalization layer.

C. The method of paragraph B, wherein a value of the scalar vector is based at least in part on the variance and the first learned parameter, wherein the variance is a historical variance associated with the training and the plurality of batches.

D. The method of any one of paragraphs A-C, wherein determining the modified bias is based at least in part on: determining a reduced sum of the filter, wherein the reduced sum comprises an element-by-element sum of elements of the filter; multiplying, as a product, the reduced sum by a scalar associated with a scaling function of the normalization layer; and summing, as the modified bias, the product and the bias.

E. The method of any one of paragraphs A-D, further comprising: receiving sensor data; providing, as input to the modified neural network, the sensor data; receiving output from the modified neural network, the output comprising at least one of: a region of interest associated with the sensor data; an instance segmentation associated with the sensor data; a confidence level associated with the sensor data; a confidence level associated with the sensor data; one or more potential trajectories; and a final trajectory for controlling a vehicle.

F. The method of paragraph E, further comprising controlling an autonomous vehicle based at least in part on the output of the compacted neural network.

G. A system comprising: one or more processors; and a memory storing processor-executable instructions that, when executed by the one or more processors, cause the system to perform operations comprising: training an ML model comprising a normalization layer and a convolutional layer; determining, based at least in part on the plurality of batches and the training, a variance and a mean associated with the plurality of batches; determining, based at least in part on the plurality of batches and the training, a filter associated with the convolutional layer, wherein the filter comprises a weight and a bias; determining, based at least in part on at least one of the mean, the variance, a first learned parameter associated with the normalization layer, or the weight, a modified filter associated with the convolutional layer; determining, based at least in part on at least one of the mean, the variance, the first learned parameter, or the bias, a modified bias; and modifying, as a modified ML model, the ML model by replacing the normalization layer and the convolution layer with a modified convolution layer, the modified convolution layer comprising the modified filter and the modified bias.

H. The system of paragraph G, wherein an output of the normalization layer is provided as input to the convolutional layer.

I. The system of either paragraph G or H, wherein determining the modified filter comprises multiplying the filter by a scalar vector associated with a scaling function of the normalization layer.

J. The system of any one of paragraphs G-I, wherein a value of the scalar vector is based at least in part on the variance and the first learned parameter, wherein the variance is a historical variance associated with the training and the plurality of batches.

K. The system of any one of paragraphs G-J, wherein determining the modified bias is based at least in part on: determining a reduced sum of the filter, wherein the reduced sum comprises an element-by-element sum of elements of the filter; multiplying, as a product, the reduced sum by a scalar associated with a scaling function of the normalization layer; and summing, as the modified bias, the product and the bias.

L. The system of any one of paragraphs G-K, wherein: a batch of the plurality of batches comprises one or more samples; determining the variance and the mean comprises determining at least one of one or more variances or one or more means associated with a plurality of samples associated with the plurality of batches; the variance is based at least in part on the one or more variances; and the mean is based at least in part on the one or more means.

M. A non-transitory computer-readable medium storing processor-executable instructions that, when executed by one or more processors, cause the one or more processors to perform operations comprising: training an ML model comprising a linear transformation layer and a convolutional layer; determining, based at least in part on the plurality of batches and the training, a variance and a mean associated with the plurality of batches; determining, based at least in part on the plurality of batches and the training, a filter associated with the convolutional layer, wherein the filter comprises a weight and a bias; determining, based at least in part on at least one of the mean, the variance, a first learned parameter associated with the linear transformation layer, or the weight, a modified filter associated with the convolutional layer; determining, based at least in part on at least one of the mean, the variance, the first learned parameter, or the bias, a modified bias; and modifying, as a modified ML model, the ML model by replacing the linear transformation layer and the convolution layer with a modified convolution layer, the modified convolution layer comprising the modified filter and the modified bias.

N. The non-transitory computer-readable medium of paragraph M, wherein an output of the linear transformation layer is provided as input to the convolutional layer.

O. The non-transitory computer-readable medium of paragraph M or N, wherein determining the modified filter comprises multiplying the filter by a scalar vector associated with a scaling function of the linear transformation layer.

P. The non-transitory computer-readable medium of any one of paragraphs M-O, wherein a value of the scalar vector is based at least in part on the variance and the first learned parameter, wherein the variance is a historical variance associated with the training and the plurality of batches.

Q. The non-transitory computer-readable medium of any one of paragraphs M-P, wherein determining the modified bias comprises multiplying, as a product, a reduced sum of the filter with a scalar associated with a shifting function of the batch linear transformation layer.

R. The non-transitory computer-readable medium of any one of paragraphs M-Q, wherein the scalar is based at least in part on at least one of the first historical value, the second historical value, or the first learned parameter.

S. The non-transitory computer-readable medium of any one of paragraphs M-R, wherein determining the modified bias is based at least in part on: determining a reduced sum of the filter; multiplying, as a product, the reduced sum by a scalar associated with a scaling function of the linear transformation layer; and summing, as the modified bias, the product and the bias.

T. The non-transitory computer-readable medium of any one of paragraphs M-S, wherein: a batch of the plurality of batches comprises one or more samples; determining the variance and the mean comprises determining at least one of one or more variances or one or more means associated with a plurality of samples associated with the plurality of batches; the variance is based at least in part on the one or more variances; and the mean is based at least in part on the one or more means.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A method comprising:
training a neural network, based at least in part on a plurality of batches, a batch comprising a plurality of samples and the neural network comprising at least a normalization layer and a convolutional layer, wherein an output of the normalization layer is input into the convolutional layer;
determining, based at least in part on the plurality of batches and the training, a variance and a mean associated with the plurality of batches;
determining, based at least in part on the plurality of batches and the training, a filter associated with the convolutional layer, wherein the filter comprises a weight and a bias;
determining, based at least in part on at least one of the mean, the variance, a first learned parameter associated with the normalization layer, or the weight, a modified filter associated with the convolutional layer;
determining, based at least in part on at least one of the mean, the variance, the first learned parameter, or the bias, a modified bias; and
modifying, as a modified neural network, the neural network by replacing the normalization layer and the convolution layer with a modified convolution layer, the modified convolution layer comprising the modified filter and the modified bias.

2. The method of claim 1, wherein determining the modified filter comprises multiplying the filter by a scalar vector associated with a scaling function of the normalization layer.

3. The method of claim 2, wherein a value of the scalar vector is based at least in part on the variance and the first learned parameter, wherein the variance is a historical variance associated with the training and the plurality of batches.

4. The method of claim 1, wherein determining the modified bias is based at least in part on:
determining a reduced sum of the filter, wherein the reduced sum comprises an element-by-element sum of elements of the filter;
multiplying, as a product, the reduced sum by a scalar associated with a scaling function of the normalization layer; and
summing, as the modified bias, the product and the bias.

5. The method of claim 1, further comprising:
receiving sensor data;
providing, as input to the modified neural network, the sensor data;
receiving output from the modified neural network, the output comprising at least one of:
a region of interest associated with the sensor data;
an instance segmentation associated with the sensor data;
a confidence level associated with the sensor data;
a confidence level associated with the sensor data;
one or more potential trajectories; and
a final trajectory for controlling a vehicle.

6. The method of claim 5, further comprising controlling an autonomous vehicle based at least in part on the output of the compacted neural network.

7. A system comprising:
one or more processors; and
a memory storing processor-executable instructions that, when executed by the one or more processors, cause the system to perform operations comprising:
training an ML model comprising a normalization layer and a convolutional layer;
determining, based at least in part on a plurality of batches and the training, a variance and a mean associated with the plurality of batches;
determining, based at least in part on the plurality of batches and the training, a filter associated with the convolutional layer, wherein the filter comprises a weight and a bias;
determining, based at least in part on at least one of the mean, the variance, a first learned parameter associated with the normalization layer, or the weight, a modified filter associated with the convolutional layer;
determining, based at least in part on at least one of the mean, the variance, the first learned parameter, or the bias, a modified bias; and
modifying, as a modified ML model, the ML model by replacing the normalization layer and the convolution layer with a modified convolution layer, the modified convolution layer comprising the modified filter and the modified bias.

8. The system of claim 7, wherein an output of the normalization layer is provided as input to the convolutional layer.

9. The system of claim 7, wherein determining the modified filter comprises multiplying the filter by a scalar vector associated with a scaling function of the normalization layer.

10. The system of claim 9, wherein a value of the scalar vector is based at least in part on the variance and the first learned parameter, wherein the variance is a historical variance associated with the training and the plurality of batches.

11. The system of claim 7, wherein determining the modified bias is based at least in part on:
determining a reduced sum of the filter, wherein the reduced sum comprises an element-by-element sum of elements of the filter;
multiplying, as a product, the reduced sum by a scalar associated with a scaling function of the normalization layer; and
summing, as the modified bias, the product and the bias.

12. The system of claim 7, wherein:
a batch of the plurality of batches comprises one or more samples;
determining the variance and the mean comprises determining at least one of one or more variances or one or more means associated with a plurality of samples associated with the plurality of batches;
the variance is based at least in part on the one or more variances; and
the mean is based at least in part on the one or more means.

13. A non-transitory computer-readable medium storing processor-executable instructions that, when executed by one or more processors, cause the one or more processors to perform operations comprising:
training an ML model comprising a linear transformation layer and a convolutional layer;
determining, based at least in part on a plurality of batches and the training, a variance and a mean associated with the plurality of batches;
determining, based at least in part on the plurality of batches and the training, a filter associated with the convolutional layer, wherein the filter comprises a weight and a bias;
determining, based at least in part on at least one of the mean, the variance, a first learned parameter associated with the linear transformation layer, or the weight, a modified filter associated with the convolutional layer;
determining, based at least in part on at least one of the mean, the variance, the first learned parameter, or the bias, a modified bias; and
modifying, as a modified ML model, the ML model by replacing the linear transformation layer and the convolution layer with a modified convolution layer, the modified convolution layer comprising the modified filter and the modified bias.

14. The non-transitory computer-readable medium of claim 13, wherein an output of the linear transformation layer is provided as input to the convolutional layer.

15. The non-transitory computer-readable medium of claim 14, wherein determining the modified filter comprises multiplying the filter by a scalar vector associated with a scaling function of the linear transformation layer.

16. The non-transitory computer-readable medium of claim 15, wherein a value of the scalar vector is based at least in part on the variance and the first learned parameter, wherein the variance is a historical variance associated with the training and the plurality of batches.

17. The non-transitory computer-readable medium of claim 13, wherein determining the modified bias comprises multiplying, as a product, a reduced sum of the filter with a scalar associated with a shifting function of the batch linear transformation layer.

18. The non-transitory computer-readable medium of claim 17, wherein the scalar is based at least in part on at least one of the first historical value, the second historical value, or the first learned parameter.

19. The non-transitory computer-readable medium of claim 13, wherein determining the modified bias is based at least in part on:

determining a reduced sum of the filter;

multiplying, as a product, the reduced sum by a scalar associated with a scaling function of the linear transformation layer; and summing, as the modified bias, the product and the bias.

20. The non-transitory computer-readable medium of claim 13, wherein:

a batch of the plurality of batches comprises one or more samples;

determining the variance and the mean comprises determining at least one of one or more variances or one or more means associated with a plurality of samples associated with the plurality of batches;

the variance is based at least in part on the one or more variances; and the mean is based at least in part on the one or more means.

* * * * *